Figure 1:
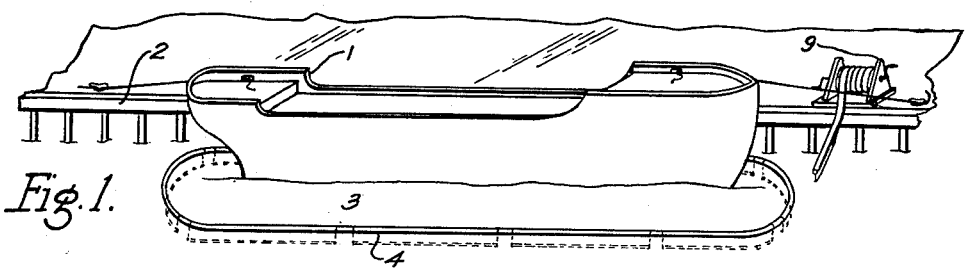

June 29, 1954  J. M. SIMPSON ET AL  2,682,151
BOOM FOR CONFINING MATERIAL FLOATING ON WATER
Filed Oct. 2, 1950

INVENTORS
J. Murray Simpson &
BY Ralph Sherman Randall

A. Schapp.
ATTORNEY

Patented June 29, 1954

2,682,151

UNITED STATES PATENT OFFICE 2,682,151

BOOM FOR CONFINING MATERIAL FLOATING ON WATER

James Murray Simpson, San Mateo, and Ralph Sherman Randall, Sausalito, Calif.

Application October 2, 1950, Serial No. 187,974

4 Claims. (Cl. 61—1)

The present invention relates to improvements in a boom for confining material floating on water, and its principal object is to provide a boom of the character described that is easy to handle, easy to store, light in weight, cheap in manufacture and that may be readily cleaned during the storing process.

It is further proposed in the present invention to provide a boom of the character described that forms a more definite barrier for oil or other material floating on water than instrumentalities that have been used heretofore for the same purpose.

Our boom is particularly intended for confining oil floating on water. When a ship is being loaded with oil it frequently happens that some of the oil is spilled into the surrounding water, and it is very desirable to keep this oil from spreading. Various devices have been known heretofore that have been used for this purpose, as for instance a chain formed of desired lengths of wood say about 4 x 4 inches in cross-section or of cork of similar dimensions, but it has been found that these booms are very difficult to handle and that the work of applying the same is very laborious quite apart from the fact that the booms are difficult to clean and take up a lot of space when stored away.

In the present invention it is proposed to utilize a boom made of fire-resistant, flexible material such as plastic, and in the form of a hollow tube or hose provided with suitable means for inflating and deflating the same.

It is further proposed to provide a hose of this character with a lengthwise fin adapted for extending vertically into the body of water and weighted along its lower edges.

It is further proposed to provide suitable means for inflating and deflating the hose while the same is manipulated either for applying to a water surface or for storing.

It is also proposed to arrange the hose and the suspended fin in such a manner that the hose may be deflated so as to flatten in the plane of the fin and so as to be adapted for being wound upon a reel or the like for storage purposes.

One particular advantage of our boom is that the fin extends into the water more deeply than any floating piece of wood or cork would do and thus forms a more effective barrier which does not lift out of the water very easily even in stormy weather where the waves rise to considerable height.

It is further proposed in the present invention to provide means for connecting successive lengths of hose to provide the full length required for surrounding or insulating a ship, and to provide means for bridging the gaps between the different lengths so as to prevent escape of oil between the lengths.

Further objects and advantages of our invention will appear as the specification proceeds, and the novel features of our invention will be fully defined in the claims attached hereto.

Figure 2:
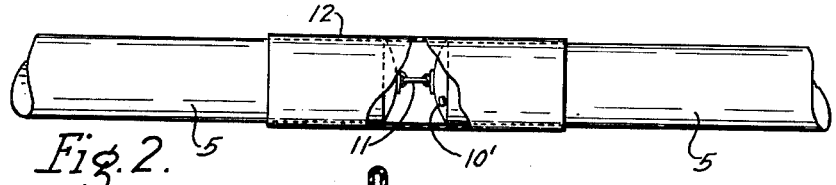
Figure 3:
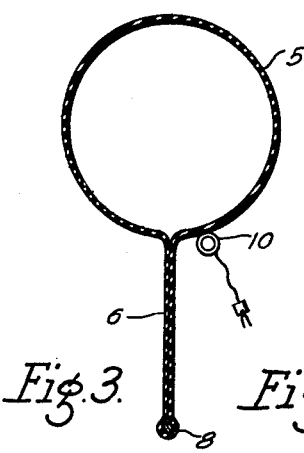
Figure 4:
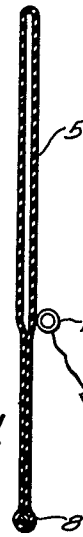
Figure 5:
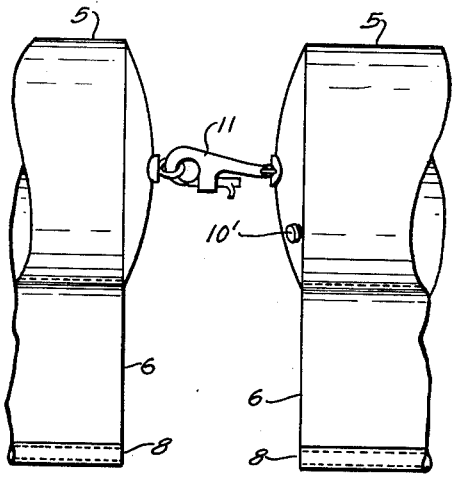
Figure 6:
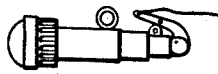
Figure 7:
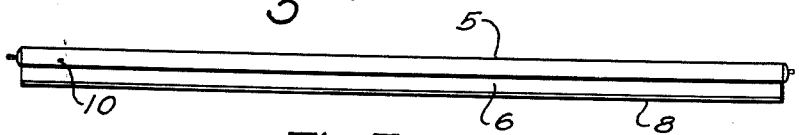

The preferred form of our invention is illustrated in the accompanying drawing, in which Figure 1 shows a perspective view explaining the use of the boom, Figure 2, a plan view showing two adjacent fragmentary sections of the boom, Figure 3, a vertical section through the boom as inflated, Figure 4, a vertical transverse section through the boom as deflated, Figure 5, a side view showing two adjacent ends of the boom with fastening means for the same, Figure 6, a detail view of an inflating device, and Figure 7, a detail view of one full length of boom on a reduced scale.

While we have shown only the preferred form of our invention, we wish to have it understood that various changes and modifications may be made within the scope of the claims attached hereto without departing from the spirit of the invention.

Referring to the drawing in detail, Figure 1 illustrates the manner in which the boom is used. A ship 1 is shown as floating on a body of water, adjacent a wharf 2, and it is assumed that considerable oil has been spilled in the loading of the ship or otherwise and is floating on the water as at 3. The boom 4 indicated sketchily in Figure 1 is made to surround the ship at a certain distance from the same so as to confine the oil and to prevent the same from spreading. In actual practice the oil may be picked up at a later time by spreading straw or similar material on the surface and removing the latter material after it has soaked up the oil.

Our boom is made in the form of different lengths of hose indicated at 5, the hose being approximately 5 inches in diameter, approximately 30 feet in length for convenient handling, and being made of light flexible material such as plastic which is substantially fire-resistant and puncture-proof and capable of being inflated and deflated.

Each length of hose has a fin 6 projecting therefrom, the fin being preferably made of the same material and being formed, at the extreme end thereof, with a pocket 8 adapted to be filled with a suitable weight such as lead shot which causes the fin to automatically assume a vertical position, extending downwardly into the water, when the hose floats on the water surface.

When the hose is deflated as in Figure 4 it can be made to lie in the plane of the fin so as to form a flat structural unit therewith adapted for winding upon a reel such as is shown at 9 in Figure 1. Inflating means such as a conventional $CO_2$ cartridge 10 illustrated in Figure 6 may be secured upon either end of the hose lengths, preferably the rear end for manual operation for an attendant at the reel 9.

A suitable deflation valve 10' may be arranged at either end of the hose lengths, but preferably at the rear end to allow the hose lengths to become deflated during the winding operation.

Adjacent lengths of hose may be connected by means of any suitable clamping device 11 as illustrated in Figure 5.

The space between two adjacent lengths of hose may be bridged by means of a sleeve 12 which may be permanently secured upon the rear end of one length and made to telescope over the front end of the adjacent length. If it appears desirable the sleeve may of course be formed with a downwardly projecting fin corresponding to the fin 6 of the hose.

In applying the boom, the required number of lengths of hose may be wound, in flattened condition, upon one or more reels which may be located on the wharf as shown, and the successive lengths may be secured upon one another, either during the winding operation or during the unwinding operation, whichever method proves more effective. For unwinding, the front end of the foremost length may be secured upon a boat which travels around the ships to be insulated and thereby unwinds the hose from the reel and places it on the body of water. As each length is unwound, an attendant may operate the charging device at the rear end of each length for inflating the same which will cause the length of hose to float on the water with the fin depending therefrom. After the desired length of hose has been fed upon the water, opposite ends may be connected to one another, if the whole boat is to be encircled, or may be secured upon the wharf or the boat if only a portion is to be encircled. The oil on the water will then be confined to a definite area, from which it may be removed at any time by any suitable method.

For removing the hose the process is reversed and the hose is again wound upon the reel, an attendant opening the release valves at suitable times as each length is wound upon the reel. It is apparent that in the winding process the hose may be readily cleaned of any adhering oil by any suitable method.

We claim:

1. A boom for confining material floating on water, comprising an inflated tube made of flexible material, a fin of flexible material suspended therefrom from end to end and having a depth substantially equal to the diameter of the tube, and a continuous flexible ballast disposed along the lower border of the fin and confined within the material and substantially within the plane thereof, the ends of the tube being free to allow the deflated tube to flatten into the plane of the fin to facilitate the winding of the boom upon a reel, and to facilitate the cleaning of the flattened boom in connection with the winding operation.

2. A boom for confining material floating on water, comprising an inflated tube made of flexible material, a fin of flexible material suspended therefrom from end to end and having a depth substantially equal to the diameter of the tube, and a flexible ballast disposed along the lower border of the fin and confined within the material and substantially within the plane thereof, the ends of the tube being free to allow the deflated tube to flatten into the plane of the fin to facilitate the winding of the boom upon a reel and to facilitate the cleaning of the flattened boom in connection with the winding operation, the tube having an air outlet valve at the far end thereof to allow the air to be forced out of the tube during the winding operation.

3. A boom for confining material floating on water, comprising an inflated tube made of flexible material, a fin of flexible material suspended therefrom from end to end and having a depth substantially equal to the diameter of the tube, and a continuous flexible ballast disposed along the lower border of the fin and confined within the material and substantially within the plane thereof, the ends of the tube being free to allow the deflated tube to flatten into the plane of the fin to facilitate the winding of the boom upon a reel and to facilitate the cleaning of the flattened boom in connection with the winding operation, and the tube having axial flexible couplings at opposite ends thereof for connection to adjacent tubes with freedom of up and down movement with respect thereto in response to wave motions.

4. A boom for confining material floating on water, comprising an inflated tube made of flexible material, a fin of flexible material suspended therefrom from end to end and having a depth substantially equal to the diameter of the tube, and a continuous flexible ballast disposed along the lower border of the fin and confined within the material and substantially within the plane thereof, the ends of the tube being free to allow the deflated tube to flatten into the plane of the fin to facilitate the winding of the boom upon a reel and to facilitate the cleaning of the flattened boom in connection with the winding operation, the tube having axial flexible couplings at the ends thereof for connection to adjacent tubes, and the tube having a flexible sleeve secured upon one end thereof and extending beyond the same and adapted for telescoping over the end of an adjacent tube to form a bridge over the coupling.

References Cited in the file of this patent

UNITED STATES PATENTS

| Number | Name | Date |
| --- | --- | --- |
| 1,171,153 | Steinmetz | Feb. 8, 1916 |
| 1,796,595 | Dunbar | Mar. 17, 1931 |
| 2,191,374 | Dixon | Feb. 20, 1940 |
| 2,240,567 | Meacham et al. | May 6, 1941 |
| 2,370,000 | Patten | Feb. 20, 1945 |
| 2,391,059 | Macfarren | Dec. 18, 1945 |
| 2,401,453 | Bell et al. | June 4, 1946 |
| 2,518,091 | Stopkevyc | Aug. 8, 1950 |